Feb. 14, 1933. B. J. VICTOR 1,897,088
GASKET
Filed July 23, 1930
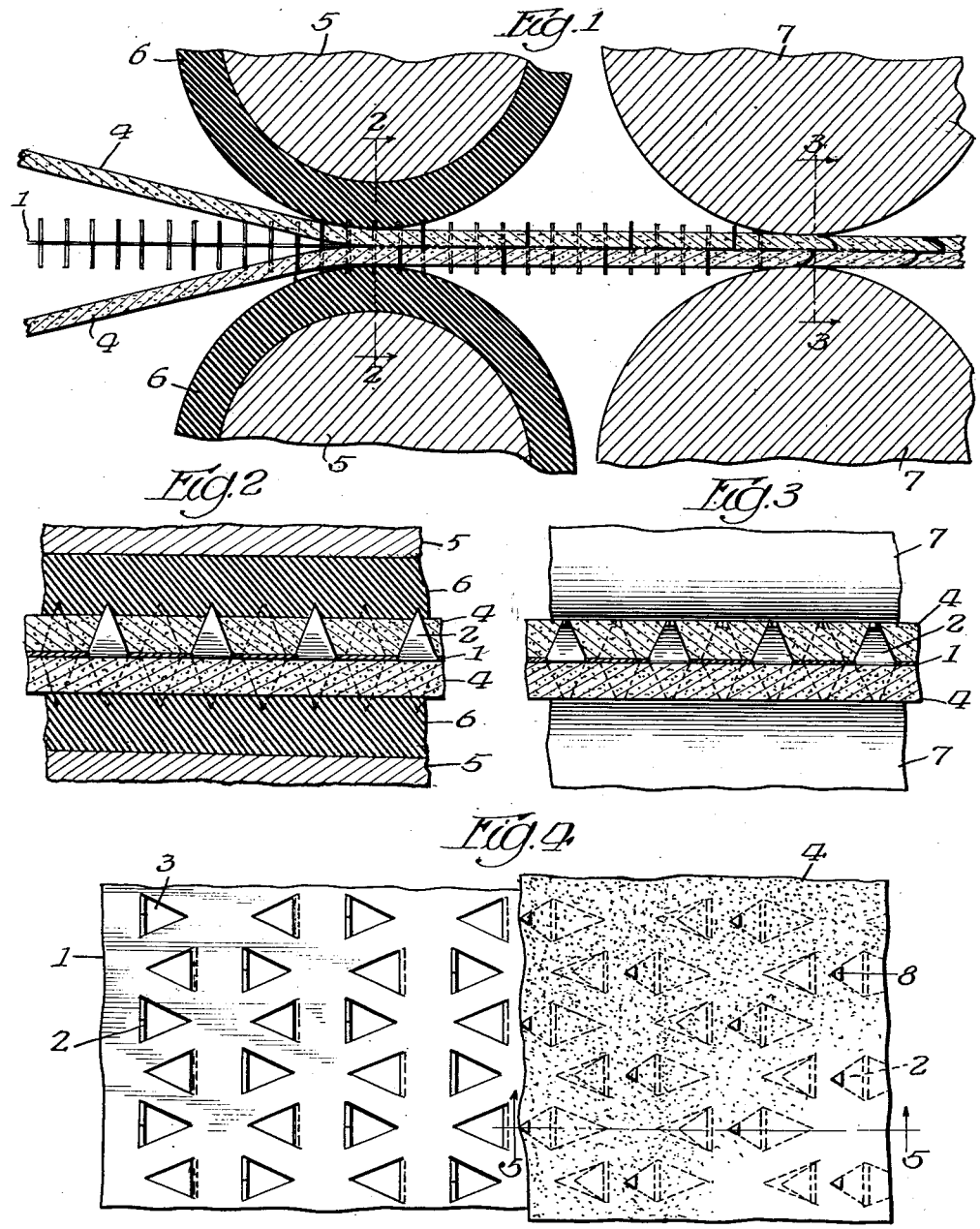
Fig.5 Inventor
Benjamin J. Victor
By Wm O. Bell Atty.

Patented Feb. 14, 1933

1,897,088

UNITED STATES PATENT OFFICE

BENJAMIN J. VICTOR, OF OAK PARK, ILLINOIS, ASSIGNOR TO VICTOR MANUFACTURING & GASKET COMPANY, OF CHICAGO, ILLINOIS, A CORPORATION OF ILLINOIS

GASKET

Application filed July 23, 1930. Serial No. 470,057.

This invention relates generally to the art of gaskets and more particularly to a material of which gaskets can be made, and to the method of making this material in sheet form. Gaskets are made in a great variety of sizes, shapes and models and while the material of this invention may be used alone for making gaskets of some kinds for some purposes it can also be used in an assembly for making gaskets of other kinds or for other purposes, and therefore I refer to the material generally as a gasket material for making any kind of gasket for which it is or may be adapted.

The primary object of the invention is to provide a gasket material of novel construction having sufficient stability to maintain it in proper condition for use and which can be manufactured economically in different kinds of gaskets and in varieties of sizes and shapes.

Another object is to provide gasket material in sheet form having a metal core faced on both sides with layers of heat-resisting material, such as asbestos or asbestos composition, which is mechanically secured to the core by means of flexible prongs bent in the operation of making the material to anchor the asbestos layers to the core.

Another object is to provide a novel method for making the gasket material in sheet form in a simple, rapid and economical roll operation.

In the accompanying drawing I have illustrated the invention and the method of manufacture in a simple embodiment and referring thereto, Fig. 1 shows the two sets of rolls in section and the gasket material being made therein.

Figs. 2 and 3 are sectional views on the lines 2—2 and 3—3 of Fig. 1 respectively.

Fig. 4 is a detail plan view showing a section of core partly faced with layers of heat-resisting material.

Fig. 5 is a detail sectional view on the line 5—5 of Fig. 4.

The gasket material comprises a metal core 1 having a plurality of prongs 2 struck up on opposite sides thereof leaving openings 3. In the preferred construction of core, as shown in Fig. 4, the prongs are arranged in pairs of rows with the prongs of one row projecting on one side of the core and the prongs of the other row projecting on the other side of the core and with the prongs of one row in staggered relation to the prongs of the other row. The openings formed by one of the rows of prongs are arranged in overlapped relation with the openings formed by the other row of the pair of rows of prongs and the openings in one row are directed oppositely with respect to the openings in the other row. The prongs may be located as close together as desired but I have indicated a disposition of the prongs which is satisfactory for the purpose and which provides a core having the requisite stability and stiffness in sheet material and in the gaskets made therefrom. The core may be made of steel or any other metal or material suitable for the purpose and in any gage found to be desirable for material for different uses. The heat-resisting material 4 preferably consists of asbestos or asbestos composition and it is conveniently provided in the form of mill-board which is preferably softened by moistening; but heat-resisting material of any kind may be used and it may be applied to the core as it is manufactured and while still soft enough to embed the prongs. In the manufacture of the gasket material the core and oppositely arranged layers of the heat-resisting material 4 are passed between rolls 5 having soft facings 6, Fig. 1, which force the layers upon the prongs and flatly against the body of the core. The prongs are of sufficient size to project through the layers and the points of the prongs may enter the soft facings 6 of the rolls 5 so that the rolls will uniformly and evenly seat the layers upon the body of the core. The core may be made of light gage metal or, if greater stiffness is required, heavier gage may be employed; the layers of heat-resisting material may be made of any thickness to meet the requirements for the manufacture of gaskets; and the prongs may be made in any number and arrangement and form to perform the functions of this invention in the manner herein set forth. It is important that the prongs should be clenched in the heat-resisting layers and they must be long enough for this purpose, but it is not necessary that they should enter the soft facings of the rolls 5 or that they should project to any material extent through the outer surfaces of the layers so long as it is possible in the succeeding operation to clench the prongs in the layers. From the rolls 5 the work passes to hard faced rolls 7 which bend the prongs in the same general direction and clench the points thereof in the layers to anchor the layers on the core in a secure and uniform manner. The layers are desirably compressible and the rolls 7 compress these layers and embed the points 8 of the prongs in the layers. After the work leaves the rolls 7 the compressed sheet material will expand slightly without lifting the points 8 of the prongs and the result is that in the finished sheet these points are depressed below the outer surfaces of the layers, or at least they will not project above the surfaces, and these surfaces are smooth and free from projections which might interfere with shipping, handling and using the gasket material or the gaskets. When the core is made the prongs project outward substantially at right angles to the body of the core and this facilitates engaging the heat-resisting layers thereto because the prongs will readily pierce the layers and the points of the prongs will enter the soft facings on the rolls 5. The points of the prongs are bent over by the rolls 7 and at the same time the prongs are bent bodily to a more or less inclined position relative to the body of the core as indicated in Fig. 5, which clenches the prongs in the layers of heat-resisting material and secures the layers immovably upon the core. The heat-resisting layers are secured uniformly on the sides of the core to provide gasket sheet material of substantially uniform thickness throughout with smooth surfaces. The points of the prongs may or may not show on the surfaces of the gasket sheet material, depending upon the size of the prongs, the thickness of the heat-resisting layers or other conditions, but whether they do or not is not important as long as they do not project and interrupt the smooth surfaces of the gasket or prevent the gasket from compressing when the joint to which it is applied is tightened. In the manufacture of the gasket sheet material, especially in production work, the prongs may not be bent exactly as shown in the drawing and the prongs may be bent differently in a single sheet, depending upon many different conditions, but it is not material to my invention so far as I have yet discovered that the prongs should be bent exactly as shown in the drawing, and although I find this to be a desirable construction I believe it will be sufficient that the prongs are clenched upon the heat-resisting layers in any manner suitable for securing the layers to the core.

The sheet material may be used for other purposes than gaskets and it may be necessary or desirable to change the form, construction and arrangement of parts to adapt the invention to gaskets and other articles as now or hereafter made and I reserve the right to make all such changes as fall within the scope of the following claim:

I claim:

The herein described method of making sheet material for use in the manufacture of gaskets and the like which consists in providing sheets of gasket material and a metal core having prongs projecting outwardly from both sides thereof, arranging the core between two sheets of gasket material and pressing the sheets upon the core to arrange the sheets and core in parallel and contacting relation by passing the sheets and core between a pair of soft faced rolls, and in then bending the prongs bodily to clench them in the sheets with their points below the outer surfaces of the sheets by passing the sheets and core between a pair of hard faced rolls.

BENJAMIN J. VICTOR.